US010528478B2

(12) United States Patent
Rana

(10) Patent No.: US 10,528,478 B2
(45) Date of Patent: Jan. 7, 2020

(54) PAGE TABLE MANAGEMENT FOR DIFFERING VIRTUAL AND PHYSICAL ADDRESS PAGE ALIGNMENT

(71) Applicant: ATI Technologies ULC, Markham (CA)

(72) Inventor: Dhirendra Partap Singh Rana, Markham (CA)

(73) Assignee: ATI TECHNOLOGIES ULC, Markham, Ontario (CA)

( * ) Notice: Subject to any disclaimer, the term of this patent is extended or adjusted under 35 U.S.C. 154(b) by 42 days.

(21) Appl. No.: 15/608,343

(22) Filed: May 30, 2017

(65) Prior Publication Data

US 2018/0349286 A1  Dec. 6, 2018

(51) Int. Cl.
*G06F 12/10* (2016.01)
*G06F 12/1009* (2016.01)

(52) U.S. Cl.
CPC .... *G06F 12/1009* (2013.01); *G06F 2212/652* (2013.01)

(58) Field of Classification Search
None
See application file for complete search history.

(56) References Cited

U.S. PATENT DOCUMENTS

| 6,088,780 | A | * | 7/2000 | Yamada | G06F 12/1009 711/204 |
| 9,058,268 | B1 | * | 6/2015 | Ostiguy | G06F 12/0802 |
| 2012/0060012 | A1 | * | 3/2012 | Olszewski | G06F 12/1009 711/171 |
| 2016/0098207 | A1 | * | 4/2016 | Guo | G06F 3/0608 711/154 |
| 2017/0199827 | A1 | * | 7/2017 | Sankaran | G06F 9/45558 |
| 2017/0212837 | A1 | * | 7/2017 | Breternitz | G06F 12/0833 |
| 2018/0165218 | A1 | * | 6/2018 | Parker | G06F 12/1416 |

* cited by examiner

*Primary Examiner* — Ryan Bertram
*Assistant Examiner* — Trang K Ta
(74) *Attorney, Agent, or Firm* — Volpe and Koenig, P.C.

(57) ABSTRACT

Techniques for managing page tables for an accelerated processing device are provided. The page tables for the accelerated processing device include a primary page table and secondary page tables. The page size selected for any particular secondary page table is dependent on characteristics of the memory allocations for which translations are stored in the secondary page table. Any particular memory allocation is associated with a particular "initial" page size. Translations for multiple allocations may be placed into a single secondary page table, and a particular page size is chosen for all such translations. The page size is the smallest of the natural page sizes for the allocations that are not using a translate further technique. The translation further technique is a technique wherein secondary page table entries do not themselves provide translations but instead point to an additional page table level referred to as the translate further page table level.

20 Claims, 7 Drawing Sheets

PAGE TABLE MANAGEMENT FOR DIFFERING VIRTUAL AND PHYSICAL ADDRESS PAGE ALIGNMENT

TECHNICAL FIELD

The disclosed embodiments are generally directed to page tables, and in particular, to page table management for differing virtual and physical address page alignment.

BACKGROUND

Virtual memory is a mechanism whereby physical memory addresses are obscured from software through a translation mechanism. The translation mechanism adds security, memory isolation, programming convenience, and other benefits, but adds a performance hurdle associated with the address translations. Improvements to the virtual memory mechanism are constantly being made.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for managing page tables for an accelerated processing device. The techniques include maintaining different page alignments in physical memory and virtual memory. The page tables for the accelerated processing device include at least a primary page table (also called a "page directory") and secondary page tables (also simply called "page tables"). Each secondary page tables store translations for homogenously sized memory pages. For example, one secondary page table stores translations for 4 KB pages (and not for pages of any other size) and another secondary page table stores translations for 64 KB pages (and not for pages of any other size).

The page size selected for any particular secondary page table is dependent on characteristics of the memory allocations for which translations are stored in the secondary page table. Memory allocations are requests made by software (such as an application executing on a central processing unit) for memory space. Any particular memory allocation in a particular secondary page table is associated with a particular "natural" or "desirable" page size (also referred to herein as an "initial page size"). In one example, this "natural" page size is the largest possible page size for which the address range of the allocation within the secondary page table is an integer multiple. For example, if translations for 1 MB of an allocation are placed in a secondary page table, then the "natural" page size for that allocation is 1 MB. If translations for 768 KB of an allocation are placed in a secondary page table, then the "natural" page size for that allocation is 256 KB.

Translations for multiple allocations may be placed into a single secondary page table. In that situation, a particular page size is chosen for all such translations in that secondary page table. The page size chosen is the smallest of all the natural page sizes for the allocations that are not using a translate further technique. The translation further technique is a technique wherein secondary page table entries do not themselves provide translations but instead point to an additional page table level referred to as the translate further page table level.

Figure 1:
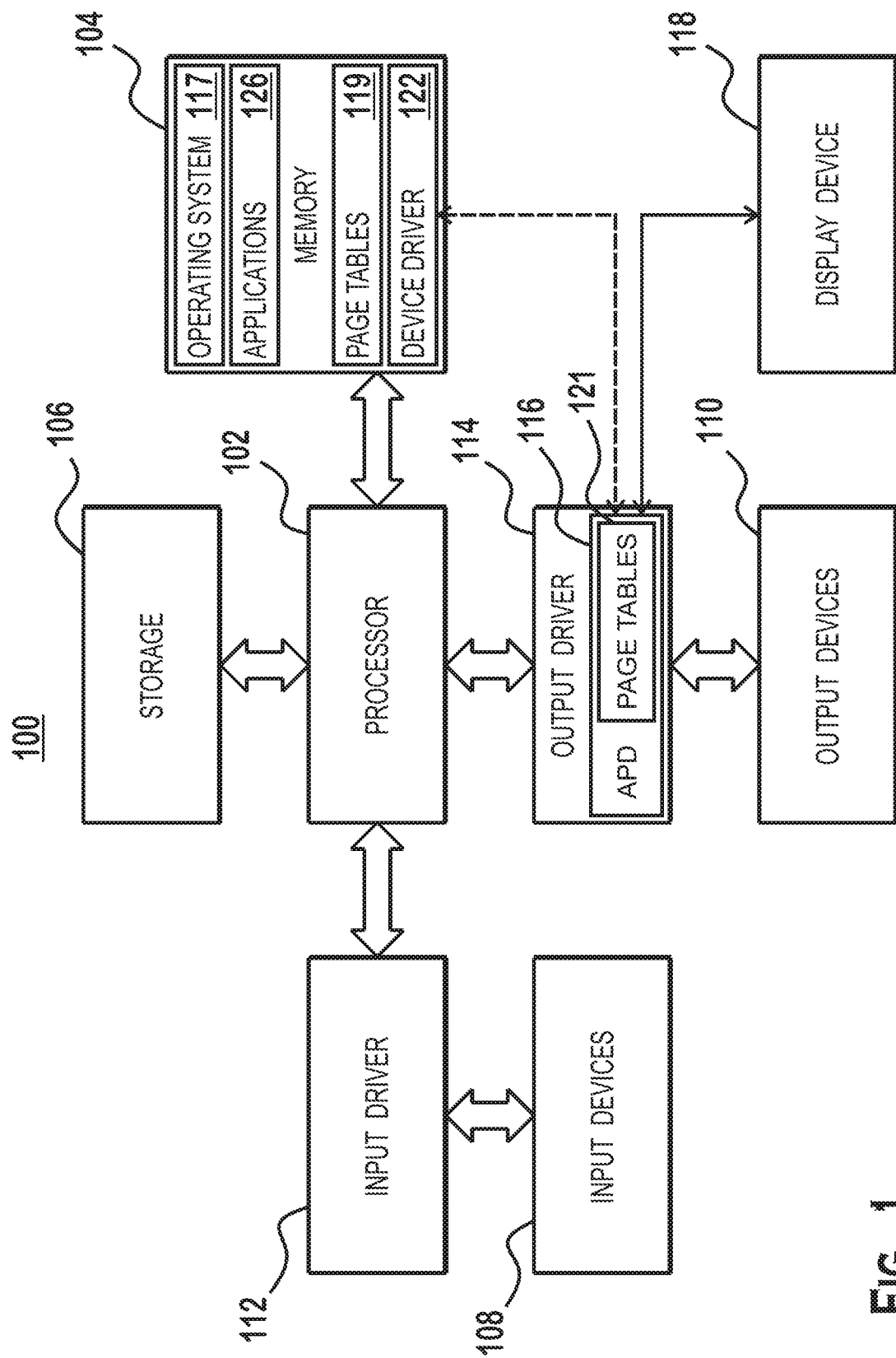
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

The APD 116 includes a parallel processing unit configured to perform computations in accordance with a single-instruction-multiple-data ("SIMD") paradigm. Although one APD 116 is illustrated, it should be understood that the teachings provided herein apply to systems including other numbers of APDs 116. Also, functionality described as being performed by the APD 116 may also be performed by processing devices that do not process data in accordance with a SIMD paradigm.

The operating system 117 coordinates and controls operation of various components of the device 100. The applications 126 comprise user-mode software executed by the processor 102 that are capable of requesting work to be performed on the APD 116 via the device driver 122 and of performing other types of work on the processor 102 or other units. The device driver 122 is software that executes on the processor 102 and that controls operations of the APD 116, at the control and direction of the operating system 117, applications 126, or other actors. The page tables 119, stored in system memory 104, store translations from addresses in a virtual address space to a physical address space. Software executing on the processor 102 accesses memory, which may result in accesses to the page tables 119 in system memory 104 to perform translations from virtual addresses to physical addresses. As is generally known, virtual addressing is a technique by which the operating system 117 obscures physical addresses to provide memory isolation, security, and other benefits to user-mode software. Elements accessing memory via virtual addresses trigger memory address translations in order to be able to access memory. Page tables 119 store the address translations for the address translation lookup process.

The page tables 121 stored in memory of the APD 116 store translations from addresses in a virtual address space to a physical address space, for use by the APD 116. The operating system 117 controls both the page tables 119 in system memory 104, and the page tables 121 in the APD 116, with the assistance of device driver 122. More specifically, the operating system 117 performs various operations to create, delete, or modify translations in the page tables 119 and the page tables 121. In some implementations, the page tables 121 in the APD 116 are stored in the memory 104 instead of in a memory internal to the APD 116 (such as APD memory 120, illustrated in FIG. 2).

Figure 2:
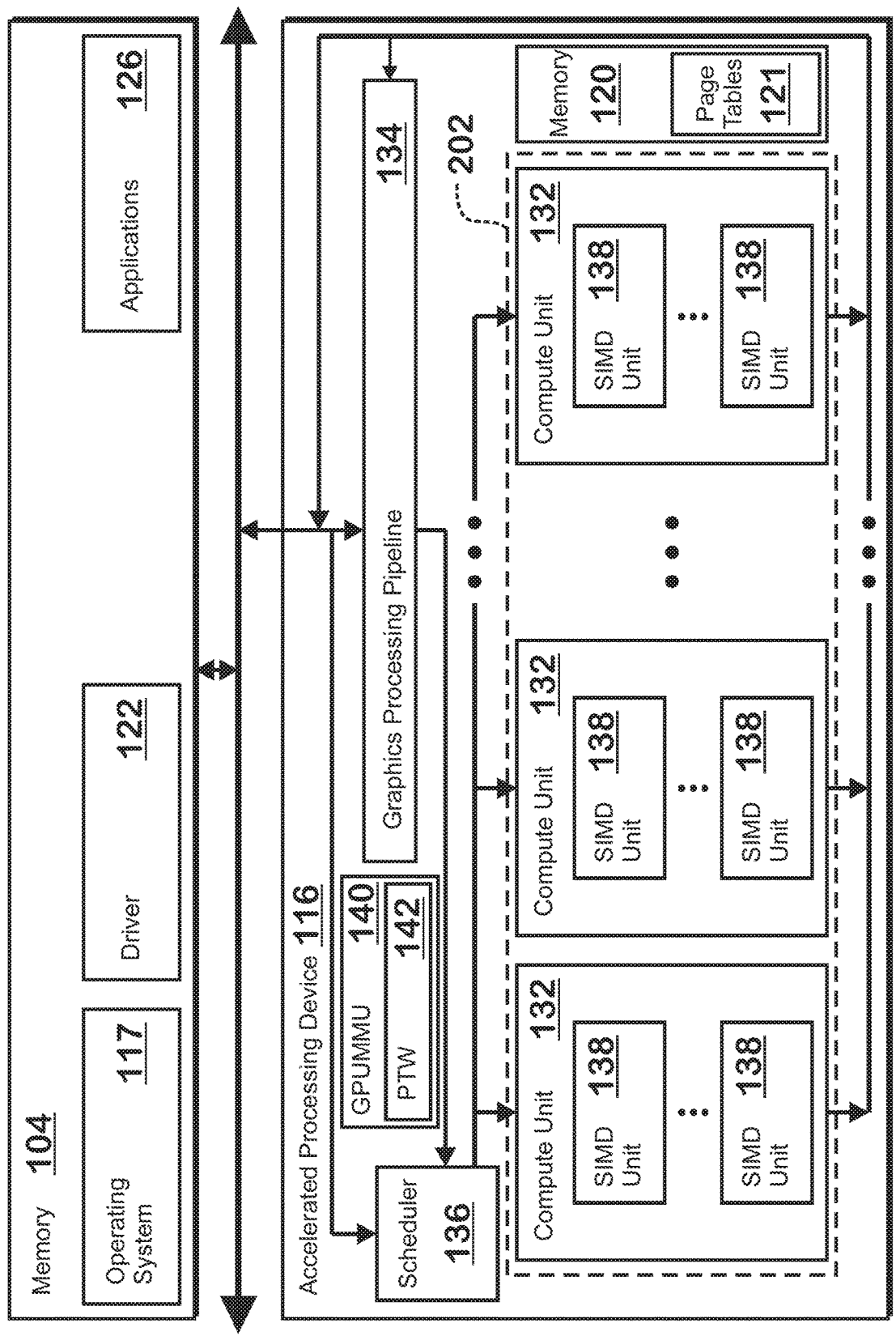
FIG. 2 is a block diagram of an accelerated processing device, according to an example.

FIG. 2 is a block diagram of an accelerated processing device 116, according to an example. The processor 102 maintains, in system memory 104, one or more control logic modules for execution by the processor 102. The control logic modules include an operating system 117, a driver 122, and applications 126. These control logic modules control various aspects of the operation of the processor 102 and the APD 116. For example, the operating system 117 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations or that are completely unrelated to graphics operations, such as operations related to video, physics simulations, computational fluid dynamics, or other tasks, based on commands received from the processor 102 or some other unit.

The APD 116 includes compute units 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in compute units 132 is a work-item. Each work-item represents a single instantiation of a program that is to be executed in parallel in a particular lane. Work-items can be executed simultaneously in a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as the largest collection of work-items that can be executed simultaneously on a single SIMD unit 138. In alternative examples, a single wavefront has too many lanes to execute simultaneously on a single SIMD unit 138; instead, the wavefront is broken down into wavefront portions, each of which has a small enough number of lanes to be executed simultaneously on a SIMD unit 138. If commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138. Scheduling involves assigning wavefronts for execution on SIMD units 138, determining when wavefronts have ended, and other scheduling tasks.

The parallelism afforded by the compute units 132 is suitable for graphics related operations such as pixel value calculations, vertex transformations, and other graphics operations. A graphics processing pipeline 134 which accepts graphics processing commands from the processor 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs") that define such computation tasks to the APD 116 for execution.

Graphics memory 120 (also "APD memory") represents physical memory assigned to the APD 116. This memory may be physically separate from system memory 104 (such as on a graphics card associated with the APD 116) or may be a designated portion of system memory 104. As described above, the page tables 121, located in graphics memory 120, store address translations from virtual memory addresses to physical memory addresses for use by the APD 116.

A graphics processing unit memory management unit ("GPUMMU") 140 handles memory accesses, including virtual-to-physical memory address translations. The GPUMMU 140 includes a page table walker 142 that is configured to perform page table walk operations to translate a virtual address into a physical address using the page tables 121.

Figure 3:
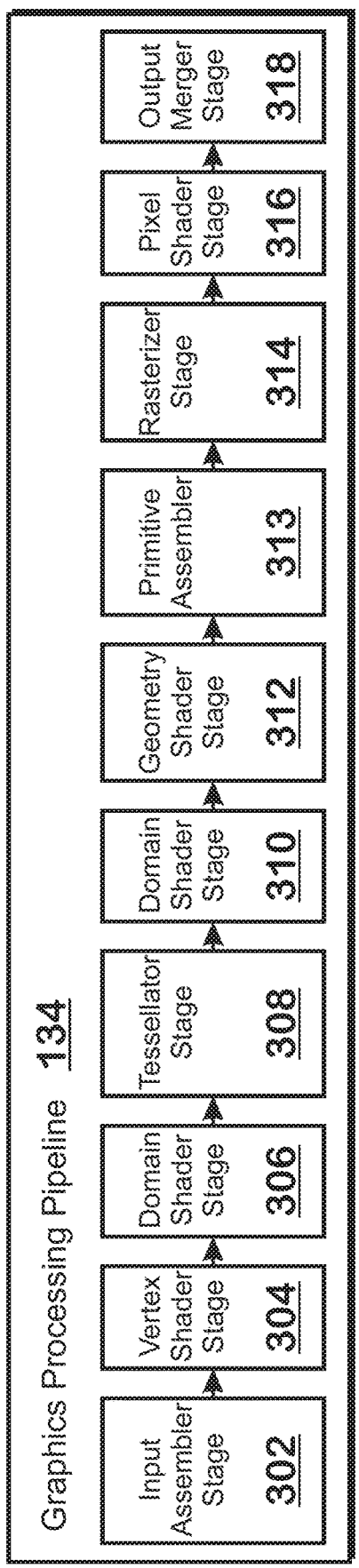
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages, each of which performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 may modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. Operations for the geometry shader stage 312 may be performed by a shader program that executes on the programmable processing units 202.

The primitive assembler 313 receives primitives from other units in the graphics processing pipeline 134 and performs certain operations to prepare those primitives for processing by the rasterizer stage 314 and subsequent stages. Those operations include, but are not limited to, performing culling such as frustum culling, back face culling, and small triangle discard, performing perspective division, and performing the viewport transform. Culling includes operations to eliminate primitives that will not contribute to the final scene. Perspective division modifies primitives to account for perspective, dividing x, y, and z coordinates by the homogeneous vertex coordinate w, which has the effect of moving farther vertices closer to the vanishing point and moving closer vertices farther from the vanishing point. The viewport transform converts the coordinates output from perspective division (normalized device coordinates) to coordinates in screen space, with coordinate values aligning with the pixel positions of a screen.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Various stages of the graphics processing pipeline 134 access the graphics memory 120 for a variety of reasons. Some such reasons include fetching vertex data, pixel data, texture data, compute data, or any other data. In fetching these items, the graphics processing pipeline 134 sometimes (e.g., when translations are not available in a translation lookaside buffer) utilizes the page tables 121 in graphics memory 120 to translate virtual addresses to physical addresses.

Although the APD 116 is described as including the graphics processing pipeline 134, in some implementations, the APD 116 does not include the graphics processing pipeline 134. In such implementations, the compute units 132 perform general purpose computing operations and may utilize the page tables 121 for address translation.

As described above, address translations are stored both in the "general purpose" page tables 119 in system memory 104 and in the page tables 121 of APD memory 120. Among other things, these page tables define memory pages, which comprise blocks of memory for which the same memory address translation exists in a page table. Pages defined by the page tables have an "alignment," described in further detail below. In some implementations, the operating system 117 imposes the restriction that the page alignment for pages in virtual memory and for pages in physical memory are the same. In such implementations, the driver 122 circumvents that restriction by independently managing the page tables 121 in order to provide differing page alignment. In other implementations, the operating system 117 does not have such a restriction and the driver 122 does not need to intervene to provide differing page alignment, as that functionality is already present in the operating system 117.

Figure 4:
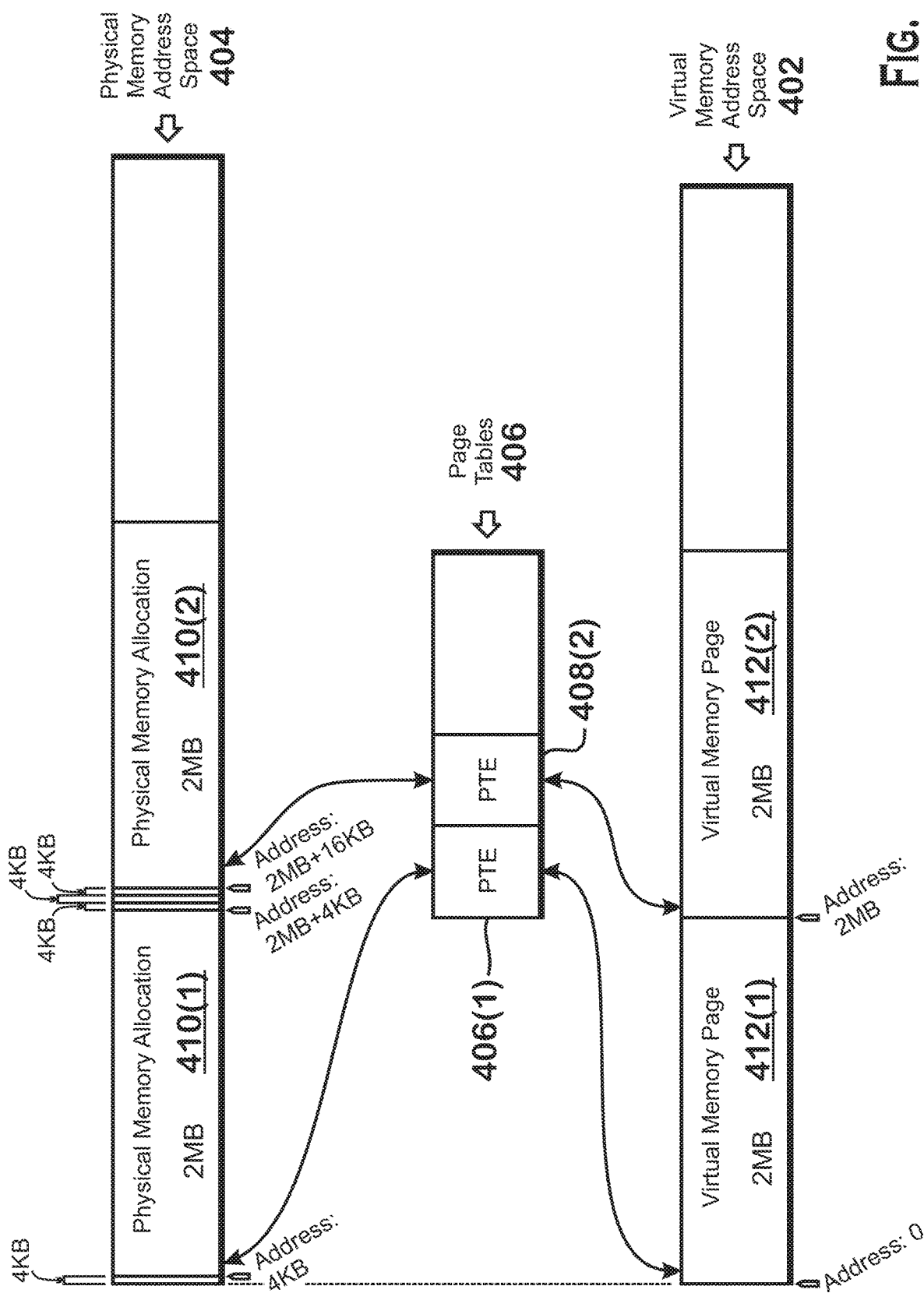
FIG. 4 illustrates address translation for a scheme in which physical and virtual addresses do not have the same alignment in memory associated with the APD, according to an example.

FIG. 4 illustrates address translation for a scheme in which physical and virtual addresses do not have the same alignment in memory associated with the APD 116, according to an example. Alignment represents the granularity with which pages can be placed in memory. More specifically, alignment dictates the memory addresses at which memory pages can begin. A larger (or "coarser") granularity limits the possible memory addresses at which memory pages can begin to more widely spaced memory addresses while a smaller (or "finer") granularity allows pages to be placed closer together. Put more precisely, a page alignment Pm is defined as the value for which all pages having that alignment begin at an address A for which A modulo Pm=0. According to several examples, pages that are 4 KB aligned all start at addresses for which the address modulo 4 KB=0. For example, pages that are 4 KB aligned may start at addresses 0, 4 KB, 8 KB, 12 KB, and so on, but cannot start at 2 KB, 6 KB, or 10 KB, for example. Pages that are 2 MB aligned can start at 0, 2 MB, 4 MB, and so on, but cannot start at 4 KB, 12 KB, or 512 KB, for example.

Some operating systems require that the alignment of pages in a virtual address space be the same as the alignment of pages in a physical address space. For example, pages in a physical memory space and pages in a virtual memory space can both have a 4 KB alignment, a 256 KB alignment, a 2 MB alignment, and so on, but cannot have different alignments, such as 4 KB for virtual pages and 256 MB for physical pages.

This requirement for having the same alignment creates issues regarding the flexibility with which entries of page tables 121 for the APD 116 can be stored. More specifically, with a same-alignment regime, each entry in the page tables 121 is at least as small as the size of the alignment. For example, if the alignment in the physical address space and the virtual address space is 256 KB, then the entries in the page tables store translations for 256 KB-or-smaller sized-pages. A page size that is greater than the alignment results in addressing and security problems.

The alignment of pages in the virtual address space does not have to be the same as the alignment of pages in the physical address space. FIG. 4 illustrates a scheme in which the alignment of memory pages in physical memory space is different than the alignment of memory pages in virtual memory space. A virtual memory address space 402 and a physical memory address space 404 are shown. The virtual memory address space 402 includes a range of virtual memory addresses (the vast majority of which is not shown) for use by application-space processes. The term "application-space," synonymous with "user-space," refers to software executing in a mode in which memory access are made with virtual addresses and a process identifier. Each application or process is assigned an independent virtual address space.

Unless a virtual-to-physical address translation is cached (for example in a translation lookaside buffer or "TLB"—not shown in FIG. 4), a memory access, which specifies a virtual address, that is performed by work executing in user space on the APD 116 (such as shader programs executing in the compute units 132) triggers a page table walk in which the APD 116 reads page tables 406, which store page table entries 408, to translate the virtual address to a physical address so that memory can be accessed. The virtual memory pages 412 in the virtual memory address space 402 have an alignment that is greater than the alignment of the pages in the physical memory address space 404. In the example of FIG. 4, these virtual memory pages 412 have a 2 MB alignment. Two example virtual memory pages 412—having addresses 0 (virtual memory page 412(1)) and 2 MB (virtual memory page 412(2))—are illustrated. The alignment of the memory pages in the physical memory address space 404 is not 2 MB but is instead 4 KB. This alignment difference means that the beginning address of virtual memory pages 412 can map to any 4 KB-aligned physical memory address. For example, virtual memory page 412(1) maps, through page table entry ("PTE") 408(1), to physical memory address 4 KB and virtual memory page 412(2) maps to physical memory address 2 MB+16 KB. Note that in the physical memory address space 404, the memory pages are not the same size as the virtual memory page 412 but are the same size or smaller than the physical memory page alignment (4 KB in the example of FIG. 4). Thus, the virtual memory page 412(1), which is a 2 MB page, maps to a continuous segment of physical memory pages that total 2 MB. The continuous segment of physical memory pages is referred to herein as a "physical memory allocation 410" because a request to allocate memory (e.g., from an application 126) results in a contiguous section of physical memory being reserved for the requesting entity.

The purpose of having different alignment in physical memory and virtual memory is to minimize fragmentation (and thus waste) in physical memory while also improving TLB performance. More specifically, fragmentation represents the memory addresses in the physical memory address space in between allocated memory but that cannot be or that is not used for allocations. Fragmentations occur for a variety of reasons. In a simple example, three allocations are made—a 2 MB allocation, a 4 KB allocation, and then a 2 MB allocation. With a greater alignment (for example, 2 MB), the 2 MB allocation could not be immediately after the 4 KB allocation. Instead, the second 2 MB allocation would have to be placed 2 MB-4 KB after the end of the 4 KB allocation, leaving 2 MB-4 KB of empty space. With 4 KB alignment, the second 2 MB allocation could be placed immediately after the 4 KB alignment, removing the fragmentation that occurs in this access pattern.

A large alignment in the virtual memory address space 402 allows for larger sized virtual memory pages 412, which in turn allows for fewer TLB entries to cover a larger amount of the memory space. More specifically, because TLB entries store translations on a per-page basis, and because the TLB is a fixed size, a large page size is associated with a larger portion of the virtual memory address space. Having the TLB store translations for a larger portion of the virtual memory address space means that a wider range of virtual-to-physical memory address translation lookups would hit in the TLB, which in turn results in a lower overall memory access time, as the number of page table walks required would be lower than if the TLB stored translations for a smaller portion of the virtual memory address space.

Although it is beneficial to have virtual memory pages having a larger size than the physical memory address alignment, not all virtual memory pages need to be the same size. Instead, the page tables 406 may store translations for pages of different sizes. Virtual memory pages of different sizes may exist for a variety of reasons. In one example, an application 126 requests an allocation of memory that not an integer multiple of a particular large page size, but that is an integer multiple of another, smaller, page size. For example, the allocation request size is 768 KB. In this example, the virtual page size used is 256 KB (768/3), so that three page table entries cover the entire allocation space without waste. In some examples, an allocation can be broken up and different portions of the allocation can use different page sizes. For example, the 768 KB allocation can use one 512 KB virtual page and one 256 KB virtual page.

Figure 5:
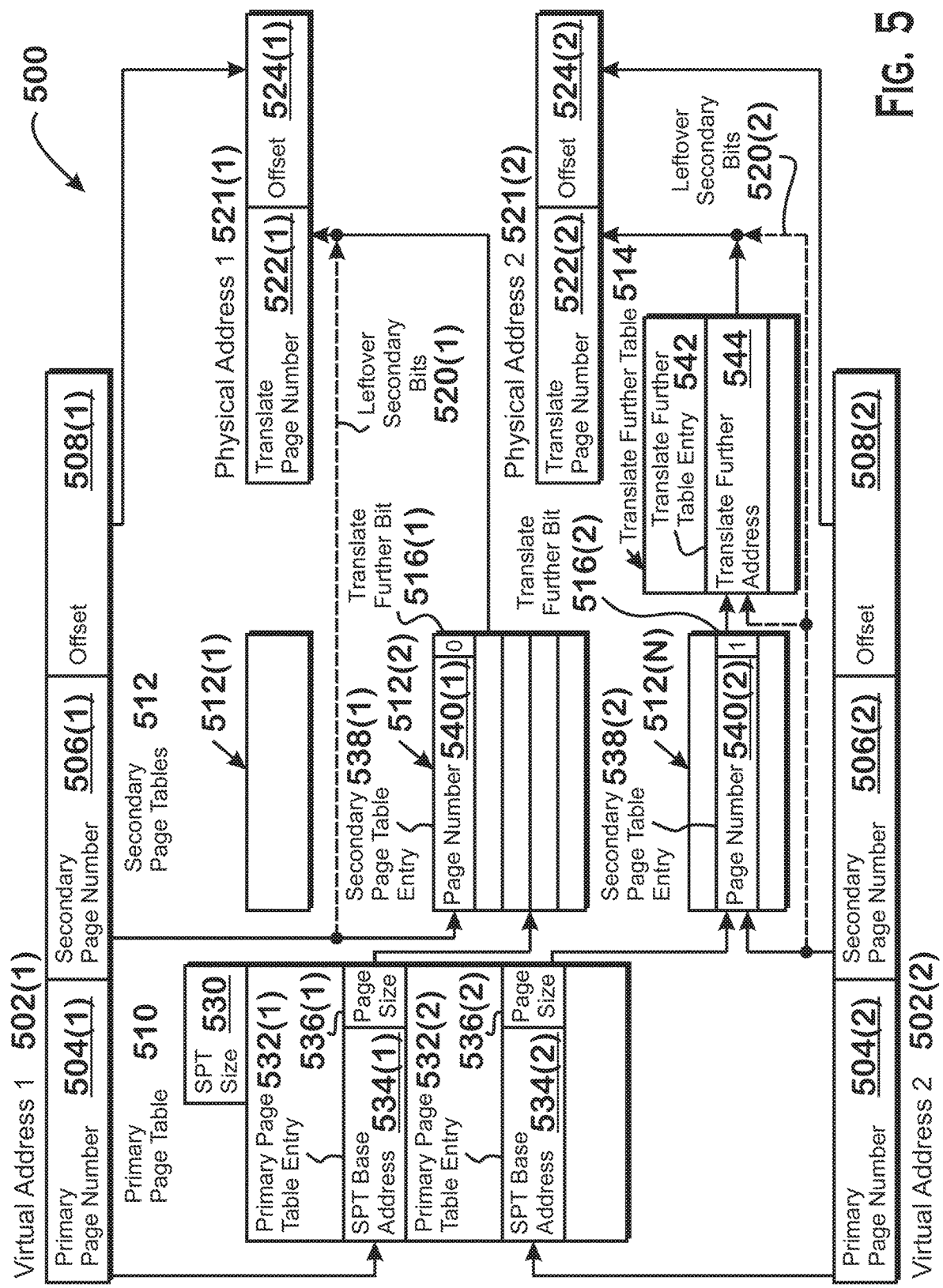
FIG. 5 illustrates example page tables for storing virtual-to-physical address translations, where virtual pages can have different sizes.

FIG. 5 illustrates example page tables 500 for storing virtual-to-physical address translations, where virtual pages can have different sizes. The page tables 500 are an example of the page tables 121 stored for the APD 116. Operations described below with respect to FIG. 5, for translating virtual addresses to physical addresses, may be performed by the GPUMMU 140, including the page table walker 142 within the GPUMMU 140.

The page tables 500 include a primary page table 510 and secondary page tables 512. The primary page table 510 includes multiple primary page table entries 532 and a secondary page table ("SPT") size indicator 530. The secondary page table size indicator 530 indicates the amount of virtual memory space covered by each secondary page table 512. In one example, the secondary page table size indicator 530 indicates that each secondary page table 512 covers a range of 2 MB. In another example, the secondary page table size indicator 530 indicates that each secondary page table 512 covers a range of 16 MB.

The primary page table 510 includes a plurality of primary page table entries 532 which may also be referred to herein as page directory entries or "PDEs." Each primary page table entry 532 is correlated to a portion of a lookup address 502 referred to as a primary page number 504. Each primary page number 504 of a virtual address 502 thus selects a unique primary page table entry 532.

Each primary page table entry 532 includes a secondary page table base address 534 that points to a particular secondary page table 512. Each primary page table entry 532 also includes a page size 536 that indicates the size of the virtual memory pages referenced by the secondary page table 512 pointed to by the secondary page table base address 534. In various examples, the page size 536 may indicate that the page virtual memory pages referenced by the secondary page table 512 have sizes of 4 KB, 64 KB, 512 KB, 2 MB, and so on. In effect, the page size 536 indicates how the virtual memory address range assigned to the secondary page table 512 is divided. For example, if the SPT size 530 is 2 MB and the page size 536 for a particular secondary page table 512 is 4 KB, then the page size 536 indicates that the 2 MB of the secondary page table 512 is divided into 512 4 KB pages. In another example, if the SPT size 530 is 2 MB and the page size 536 is 512 KB, then the page size 536 indicates that the 2 MB of the secondary page table 512 is divided into 4 512 KB pages.

Each secondary page table 512 includes one or more secondary page table entries 538. Within any particular secondary page table 512, each secondary page table entry 538 corresponds to the same size range of virtual addresses dictated by the secondary page table size 530 for that secondary page table 512. For example, if the SPT size 530 is 2 MB and the page size 536 is 128 KB, then each secondary page table entry 538 correspond to 128 KB of virtual memory address sp ace.

Each secondary page table entry 538 includes a physical page number 540. The physical page number 540 is a portion of a translated physical address 521. The physical page number 540, in addition to optional leftover secondary bits 520, and an offset 508 from the virtual address 502 being translated, results in the translated physical address 521. The optional leftover secondary bits 520 are used when the virtual page size 536 is larger than the smallest possible page size. More specifically, with the smallest possible page size, all bits of the secondary page number 506 are required to specify a particular secondary page table entry 538 and thus none are left over to add to the translated physical address 521. For example, if the virtual address is 40 bits, 14 bits might be devoted to the primary page number 504, and 14 bits might be devoted to the secondary page number 506, leaving 12 bits for the offset. If the page size were 4 KB, then 12 bits would be sufficient for the offset (because 2^12=4 KB). However, if the page size were larger, then additional bits would be needed for the offset. For example, if the page size were 64 KB, then 4 bits would be "stolen" from the secondary page number 506, as the leftover secondary bits 520, and concatenated with the offset 508 from the virtual address 502. Note that the use of leftover secondary bits 520 in the above-described manner in just one example technique for dealing with variable page sizes in the secondary page tables 512 and that other techniques are alternatively possible.

Each secondary page table entry 538 includes a translate further bit 516 that specifies whether the secondary page table entry 538 uses a translate further page table 514. A translate further page table 514 provides an additional level of translation. More specifically, if a translate further bit 516 is set, then the secondary page number 506 translates to a translated page number 522 via a translate further table 514. The bits of the secondary page number 506 are used to select a translate further table 514, which includes translate further table entries 542 that specify translate further addresses 544. A translate further address 544 is combined with the offset 508 and optional leftover secondary bits 520 to generate the translated physical address 524.

The device driver 122 manages the page tables 121 (including the secondary page tables 538) in response to various events that occur in the device 100, and cooperates with the operating system 117 to do so. One such event includes an allocation request being made by an entity such as an application 126. In an example, an application 126 requests, from the operating system 117, an allocation of 2 megabytes of space on the APD memory 120. In response, the operating system 117 finds available space in the APD memory 120 and in the virtual address space for the application 126, and notes that space in physical and virtual memory as reserved (for instance, in page tables 119 in system memory 104 or in another data structure). Additionally, the operating system 117 transmits commands to the device driver 122 to cause the driver 122 to update the page tables 121 in the APD 116 based on the reservations made. If the operating system 117 requires the same alignment in the physical address space and the virtual address space, then the driver 122 disregards the physical addresses specified by the operating system 117 and instead determines different physical addresses in the APD memory 120. In addition, the driver 122 updates the page tables 121 in the APD 116 to include translations from the specified virtual addresses to the physical addresses determined by the driver 122.

When a new allocation is made, the device driver 122 determines how to modify the primary page table 510 and the secondary page tables 512 to store the translations for the new allocation. There are several different types of modifications that can be made to the primary page table 510 and the secondary page tables 512. Several such types are now described, but these different types of modifications that can be made should not be taken to be exhaustive and it should be understood that other types of modifications can alternatively or additionally be made.

In one type of modification to or creation of a secondary page table 512, an allocation triggers creation of a single new secondary page table 512, to store address translations for that allocation. This type of operation for creating or modifying secondary page tables occurs when there is insufficient available space in another secondary page table 512 for translations for the new allocation and when the allocation is for less than or equal to the amount of space provided for each secondary page table 512 (i.e., the value indicated in the SPT size 530). In this situation, the device driver 122 selects, for the page size for that secondary page table 512, the largest page size for which the total allocation is an integer multiple of that page size. For instance, if an allocation is 768 KB, then the page size for the secondary page table 512 is 256 KB. Then, the driver 122 creates the secondary page table 512 for that allocation.

In another type of modification or creation of secondary page tables 512, an allocation occurs that triggers creation of multiple secondary page tables 512, because the amount of memory space specified for the allocation is greater than the amount of memory space specified for the secondary page tables 512 (i.e., the value indicated in the SPT size 530). In this instance, the driver 122 selects, as the page size selected for each secondary page table 512 into which allocations for the translation are placed, the largest possible page size for which the total memory address range for the translations placed into that page table is an integer multiple. In one example, an allocation is for 3 MB and the SPT size 530 is 2 MB. In this example, the driver 122 creates two secondary page tables 512—one secondary page table 512 for the first 2 MB of space allocated, and another secondary page table 512 for the next 1 MB of space allocated. For the first secondary page table 512, the driver 122 selects 2 MB as the SPT size 530, resulting in a single secondary page table entry 538 for that secondary page table 512. For the second secondary page table 512, the driver 122 selects 1 MB as the SPT size 530, also resulting in a single secondary page table entry 538 for that secondary page table 512.

In yet another example, data is evicted from the GPU memory 120 to system memory 104. In this example, because the operating system 117 maintains pages in system memory 104 having different sizes than the pages in APD memory 120, and because these pages are typically smaller than the pages in the APD memory 120, the driver 122 converts the secondary page table 512 to a page table having a page size of the physical pages in system memory 104. The driver 122 also changes the entries of the secondary page table 512 into entries of that size.

In some instances, any of the above-described secondary-page-table-related operations result in modification to already-existing secondary page tables 512. In one example, a secondary page table 512 exists but only 1 MB of address range of that secondary page table 512 is used for allocations and the remaining 1 MB of address range is unused. In this example, a new allocation for 1 MB occurs. In response, the driver 122 creates a new secondary page table entry 538 covering 1 MB for the new allocation and places that secondary page table entry 538 into the same secondary page table 512 as the previously-existing secondary page table entry 538 that also covers 1 MB of address space. In general, the driver 122 is capable of placing secondary page table entries 538 for multiple allocations into a single secondary page table 512, and is capable of doing so in various circumstances, such as when space is available in the address range of an already-existing secondary page table 512 when a new allocation is made.

In the above example, the new secondary page table entry 538 covers the same amount of address space (1 MB) as the already-existing secondary page table entry 538 that shares the same secondary page table 512 and thus both allocations use the same page size (1 MB). In other instances, the driver 122 determines that newly created secondary page table entries 538 to be placed in a particular secondary page table 512 should not or cannot have the same page size as a secondary page table entry 538 already that secondary page table 512. In that instance, the driver 122 selects a page size that is compatible with both the new secondary page table entries 538 and with the secondary page table entries 538 already in the secondary page table 512. This new page table size is the smallest size out of all secondary page table entries 538 being considered, except for secondary page table entries 512 that use translate forward. In other words, if translate forward is used for at least one or more secondary page table entries 538, then those secondary page table entries are not considered when determining which secondary page table entry 538 has the smallest size. The driver 122 then creates the new secondary page table 512 with the selected page size, converts the old secondary page table entries 538 to secondary page table entries 538 having the newly selected page size, and adds both the converted secondary page table entries 538 and the newly created secondary page table entries 538 for the new allocation to the new secondary page table 512. For the secondary page table entries 538 that use translate forward, the secondary page table entries 538 point to translate further tables 514 that have translate further table entries 542 that store the appropriate translations.

Using translate further table entries for certain secondary page table entries 538 in this manner in certain instances reduces the total number of secondary page table entries 538 for a particular secondary page table 512. This reduction is due to the fact that each secondary page table 512 only includes secondary page table entries 538 for one page size. If a very small page size were used for a secondary page table 512, then that secondary page table 512 would include a very large number of secondary page table entries 538. By using translate further, the secondary page table entries 538 in the secondary page table 512 can be kept at a larger page size. The smaller page sizes are accommodated with the translate further mechanism.

Figure 6:
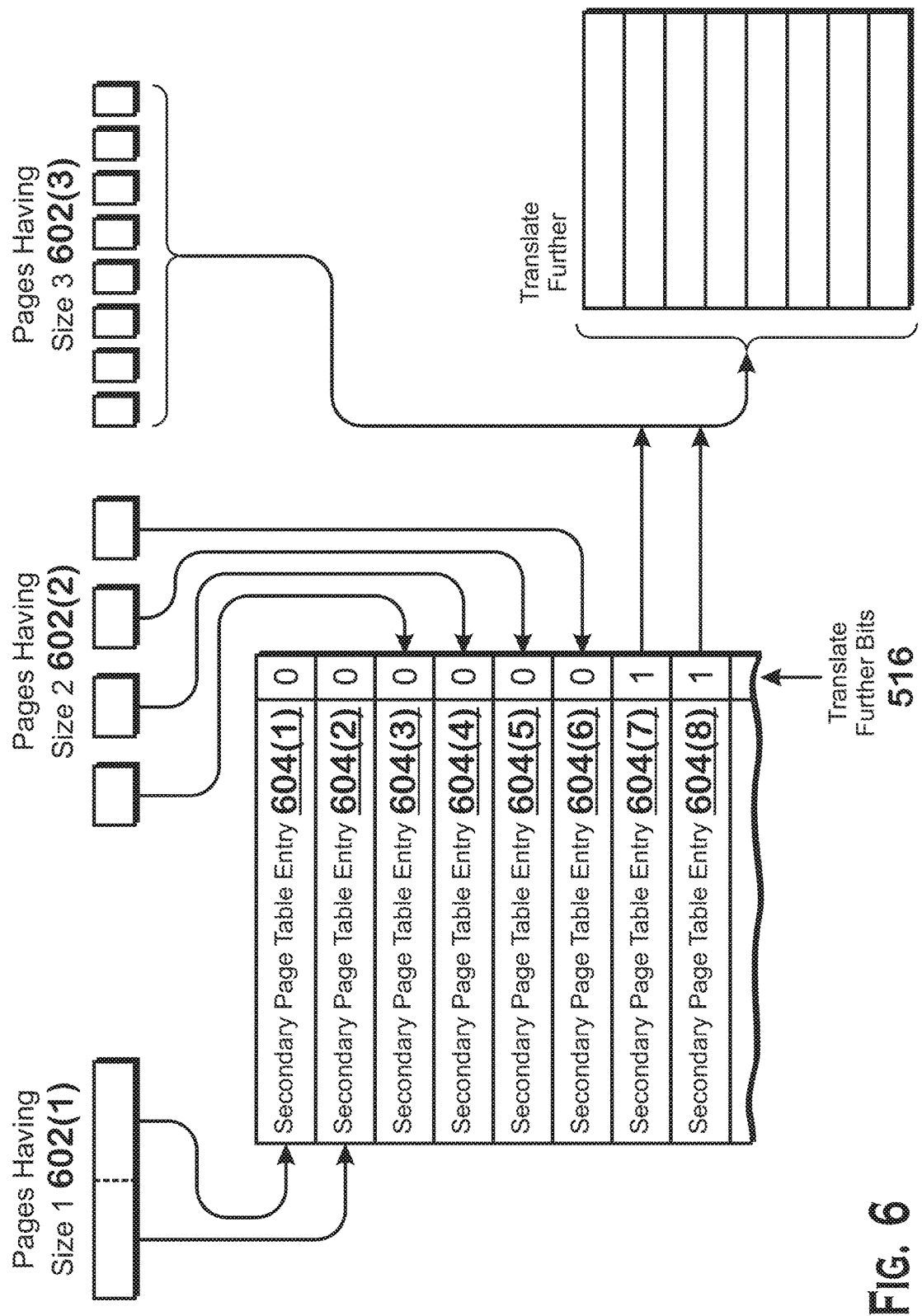
FIG. 6 illustrates an operation for generating or modifying an APD page table, according to an example.

FIG. 6 illustrates an operation for generating or modifying an APD page table 121, according to an example. The operation includes generating or modifying a secondary page table 512 as a result of one or more allocation requests being made. The example secondary page table 512 illustrated in FIG. 6 results from allocations for three different page sizes. More specifically, a first allocation for one page of size 1 602(1), a second allocation, for four pages of size 2 602(2), and a third allocation, for eight pages of size 3 602(3) are made.

The device driver 122 has determined that the translations for each of these allocations should be placed in the same secondary page table 512—the secondary page table 512 illustrated in FIG. 6. However, because each secondary page table 512 includes translations for pages of the same size, and does not include translations for pages of other sizes than that same size, the driver 122 selects a single page size for the translations from each of the three allocations shown. The page size selected is based on the smallest page size for an allocation that does not use translate further tables. The device driver 122 determines whether or not to use translate further tables for certain allocations in order to reduce the overall number of secondary page table entries 604 within the secondary page table 512.

In the example of FIG. 6, the device driver 122 has determined that the page size to be used for the secondary page table 512 is the page size for the pages having size 2 602(2) and that the pages having size 3 should use translate further. Thus, the device driver 122 divides the pages having size 1 602(1) to convert those pages to size 2, thereby creating more secondary page table entries 604 for the pages having size 1 602(1) than if size 1 were chosen for the pages of the secondary page table 512 illustrated in FIG. 6.

For the pages having size 2 602(2), the driver 122 has determined that the secondary page table 512 will use secondary page table entries 604 having that size. Thus, the driver 122 does not modify the secondary page table entries 604 for he pages having size 2. For the pages having size 3 603(3), the driver 122 has determined that those pages are to use translate further. Thus, the secondary page table entries 604 for the pages having size 3 cover address ranges corresponding to size 2, include a 1 for the translate further bits 516 and thus use the translate further tables. The fact that the secondary page table entries 604 for the pages having size 3 602(3) cover address ranges corresponding to pages having size 2 602(2) means, for example, that the allocation for pages having size 3 602(3) includes one or more secondary page table entries 604, with each one being accessed for virtual-to-physical translation for a different portion of the allocation.

Several example situations in which translate further would be used are now provided. In one example, the driver 122 selects as the size for a secondary page table 512, the size associated with the allocation that consumes the greatest portion of virtual memory address range assigned to the secondary page table 512. The page size associated with an allocation is the page size for which the portion of the allocation that is in the secondary page table 512 is an integer multiple of that size. For example, if 768 KB of an allocation is in a particular page table, the page size associated with that allocation is 256 KB. All allocations in that secondary page table associated with a larger page size than the selected page size instead use the selected page size. All allocations in that secondary page table associated with a smaller page size than the selected page size use translate further.

In another example, the page size for a secondary page table 512 is set on a first-come-first-serve basis. More specifically, if a secondary page table 512 already exists and the driver 122 determines that additional translations are to be placed in that page table, then the driver 122 maintains the page size already chosen for that secondary page table 512. For allocations to be placed in the secondary page table 512 that are associated with a page size larger than the page size of the secondary page table 512, the pages for those allocations are broken up. For allocations to be placed in the secondary page table 512 that are associated with a page size smaller than the page size of the secondary page table 152, the driver 122 uses translate further for those allocations in the secondary page table entries 604.

In yet another example, the driver 122 uses the smallest size, out of all allocations that share the secondary page table 512, as the page size for the page table, and thus never uses translate further. In a further example, the driver 122 uses the second-smallest size, so that only the smallest size uses translate further, and the second-smallest size is the page size for the secondary page table 512.

Figure 7:
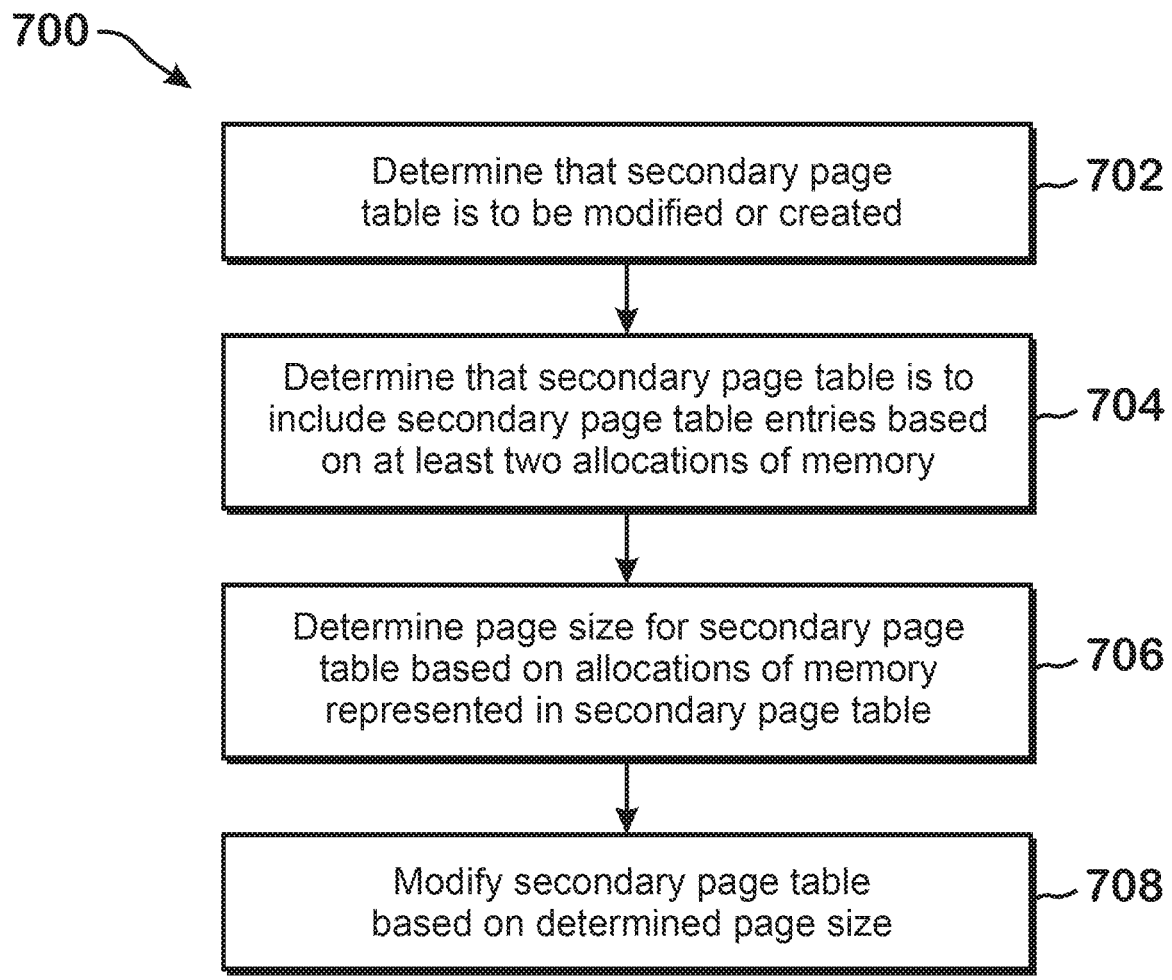
FIG. 7 is a flow diagram of a method for managing page tables, according to an example.

FIG. 7 is a flow diagram of a method 700 for managing page tables, according to an example. Although described with respect to the system shown and described with respect to FIGS. 1-6, it should be understood that any system configured to perform the method, in any technically feasible order, falls within the scope of the present disclosure.

The method 700 begins at step 702, where the driver 122 determines that a secondary page table 512 is to be modified. A large number of triggers that cause modification to the secondary page table 512 are possible. In one example, a new allocation is made and the driver 122 determines that translations for at least part of that allocation are to be placed in a secondary page table 512 that already stores translations for another allocation. In another example, data for which translations exist in a secondary page table 512 is freed, thus resulting in those translations being removed from the secondary page table 512. In yet another example, data for which translations exist in a secondary page table 512 is moved from system memory 104 to APD memory 123 or from APD memory 123 to system memory 104, thus possibly resulting in a change of the page size for that data. The above list of examples should not be taken to be an exhaustive list of all scenarios in which a modification to the page tables would change.

At step 704, the driver 122 determines that, as a result of the modification or creation of the secondary page table 512, the secondary page table 512 is to include secondary page table entries 538 that are based on at least two allocations of memory, or that the secondary page table page table 538 is to include secondary page table entries 538 associated with different page sizes, for some other reason. Various scenarios exist that would result in a secondary page table 512 including secondary page table entries 538 that are associated with different page sizes. The idea that a secondary page table entry 538 or an allocation is associated with a particular page size means that the driver 122 selects an initial page size for that secondary page table entry 538 or allocation based on aspects of that secondary page table 538 or allocation, but does not necessarily mean that that particular secondary page table entry 538 or secondary page table entries 538 for that allocation are stored in a secondary page table 512 with that page size. For example, if two allocations are made, and the driver 122 selects an initial page size for the two different allocations of 1 MB and 256 KB, respectively, those page sizes are not necessarily used for the translations stored in a secondary page table 512 for those two allocations. In the above example, with two allocations assigned to a particular secondary page table 512, the allocations associated with page sizes of 1 MB and 256 KB, respectively, the page size of 256 KB would be used for both allocations. The driver 122 may select the initial page size for any particular allocation in any technically feasible manner. In one example, the driver 122 selects an initial page size for an allocation by determining how much of that allocation is to be placed in the particular secondary page table 512 at issue and then selects the largest candidate page size for which the amount of the allocation in the secondary page table 512 is an integer multiple. In one example, translations for 1 MB of the allocation are to be placed into a particular secondary page table 512. In this situation, the initial page size for that allocation in that secondary page table 512 is 1 MB. In another example, translations for 768 KB of an allocation are to be placed into a particular secondary page table 512. In this situation, the initial page size for that allocation in that secondary page table 512 is 256 KB. In various examples, candidate page sizes include all powers of two or a subset of powers of two from a minimum value (e.g., 4 KB) to a maximum value (e.g., 2 MB). An allocation may span multiple page tables due to the allocation being for more space than is covered by a single secondary page table 512. The allocation can have different initial page sizes for different secondary page tables 512.

At step 706, the driver 122 selects a page size for the secondary page table 512 into which translations for the allocations are to be placed. The selected page size is based on the chosen initial page sizes for the two or more allocations. In one example, the driver 122 selects, as the page size, the smallest of the initial page sizes determined for the different allocations. In another example, the driver 122 selects, as the page size, the smallest of the initial page sizes determined for the different allocations for which translate further is not to be applied. For instance, if three allocations exist, with 1 MB, 256 KB, and 16 KB initial page sizes, and the driver 122 determines that the allocation with the 16 KB initial page size is to use translate further, then the driver 122 selects, as the page size for the secondary page table 512, the smallest page size not associated with an allocation for which translate further is enabled, which is 256 KB. In yet another example, the driver 122 determines the page size by selecting a page size that would result in the smallest number of secondary page table entries 538, when taking into account translate further (e.g., any entry that is translated further would have one secondary page table entry 538). The driver 122 determines whether translate further is to be used based on one of a number of different techniques, described above with respect to FIG. 5. In one example technique, translate further is used for the smallest initial page size out of initial page sizes associated with all allocations to include secondary page table entries in a secondary page table 512. In another example technique, translate further is used for all allocations having initial page sizes that are smaller than the initial page size of the allocation that takes up the largest portion of the memory address range assigned to the secondary page table 512. Other technically feasible techniques are possible as well.

At step 708, the driver 122 modifies the secondary page table 512 based on the determined page size. More specifically, the driver 122 modifies the secondary page table entries in the secondary page table 512 to the page size determined in step 706. If the new page size is smaller than the old page size, translations are split up so that the translations cover portions of the address range that correspond to the new page size. If the new page size is larger than the old page size, translations are combined so that the translations cover portions of the address range that correspond to the new page size.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for managing page tables, the method comprising:
    responsive to a memory operation occurring, determining that a modification is to be performed on a first secondary page table;
    determining, based on the memory operation, that the modification is to result in the first secondary page table including page table entries for at least two memory allocations;
    determining a page size for the first secondary page table, based on the at least two memory allocations, wherein the page size comprises a virtual page size that is larger than a physical page size of physical pages for which entries of the first secondary page table store translations; and
    modifying the first secondary page table based on the determined page size,
    wherein a primary page table stores a first primary page table entry that references the first secondary page table and a second primary page table entry that references a second secondary page table, and
    wherein the second secondary page table stores secondary page table entries that reference pages of the same size as each other and of different sizes than the page size determined for the first secondary page table.

2. The method of claim 1, wherein determining the page size for the first secondary page table based on the at least two memory allocation comprises:
    determining at least two page sizes for the at least two memory allocations, each page size of the at least two pages sizes being associated with a different memory allocation of the at least two memory allocations, at least two page sizes of the at least two pages sizes being different; and
    selecting one of the at least two pages sizes as the page size for the first secondary page table.

3. The method of claim 2, wherein determining the at least two page sizes for the at least two memory allocations comprises:
    for each memory allocation of the at least two memory allocations, identifying a memory address range for which translations are to be stored in the first secondary page table; and
    for each memory allocation of the at least two memory allocations, identifying an associated page size based on the memory address range for which translations are to be stored in the first secondary page table.

4. The method of claim 3, wherein, for any particular memory allocation of the at least two memory allocations, identifying the associated page size based on the memory address range comprises:
   selecting a largest page size, out of page sizes available, for which the memory address range is an integer multiple of that page size.

5. The method of claim 3, wherein selecting one of the at least two page sizes as the page size for the first secondary page table comprises:
   selecting, out of the at least two page sizes for the at least two memory allocations, a smallest page size.

6. The method of claim 3, wherein selecting one of the at least two page sizes as the page size for the first secondary page table comprises:
   determining that, for at least one page size of the at least two page sizes for the at least two memory allocations, a translate further technique is enabled;
   selecting, out of the at least two page sizes for the at least two memory allocations, a smallest page size for which the translate further technique is not enabled.

7. The method of claim 6, wherein determining that, for at least one page size of the at least two pages sizes for the at least two memory allocations, a translate further technique is enabled comprises:
   identifying an allocation, out of the at least two memory allocations, for which address translations cover the largest memory address range of the memory address range covered by the first secondary page table; and
   determining that the translate further technique is enabled for page sizes smaller than the allocation for which address translations cover the largest memory address range of the memory address range covered by the first secondary page table.

8. The method of claim 1, wherein:
   the memory operation comprises a memory allocation for an amount of memory, the memory allocation performed by an operating system, the operating system finding the amount of memory in a virtual memory address space for the memory allocation.

9. The method of claim 1, wherein:
   each secondary page table stores translations for the same amount of virtual memory address space.

10. A memory management system comprising:
    a processor configured to execute a driver; and
    a memory unit configured to store one or more page tables,
    wherein the driver is configured to:
      responsive to a memory operation occurring, determine that a modification is to be performed on a first secondary page table of the one or more page tables,
      determine, based on the memory operation, that the modification is to result in the first secondary page table including page table entries for at least two memory allocations, wherein the page size comprises a virtual page size that is larger than a physical page size of physical pages for which entries of the first secondary page table store translations,
      determine a page size for the first secondary page table, based on the at least two memory allocations, and modify the first secondary page table based on the determined page size,
    wherein a primary page table stores a first primary page table entry that references the first secondary page table and a second primary page table entry that references a second secondary page table, and
    wherein the second secondary page table stores secondary page table entries that reference pages of the same size as each other and of different sizes than the page size determined for the first secondary page table.

11. The memory management system of claim 10, wherein the driver is configured to determine the page size for the first secondary page table based on the at least two memory allocation by:
    determining at least two page sizes for the at least two memory allocations, each page size of the at least two pages sizes being associated with a different memory allocation of the at least two memory allocations, at least two page sizes of the at least two pages sizes being different; and
    selecting one of the at least two pages sizes as the page size for the first secondary page table.

12. The memory management system of claim 11, wherein the driver is configured to determine the at least two page sizes for the at least two memory allocations by:
    for each memory allocation of the at least two memory allocations, identifying a memory address range for which translations are to be stored in the first secondary page table; and
    for each memory allocation of the at least two memory allocations, identifying an associated page size based on the memory address range for which translations are to be stored in the first secondary page table.

13. The memory management system of claim 12, wherein for any particular memory allocation of the at least two memory allocations, the driver is configured to identify the associated page size based on the memory address range by:
    selecting a largest page size, out of page sizes available, for which the memory address range is an integer multiple of that page size.

14. The memory management system of claim 12, wherein the driver is configured to select one of the at least two page sizes as the page size for the first secondary page table by:
    selecting, out of the at least two page sizes for the at least two memory allocations, a smallest page size.

15. The memory management system of claim 12, wherein the driver is configured to select one of the at least two page sizes as the page size for the first secondary page table by:
    determining that, for at least one page size of the at least two page sizes for the at least two memory allocations, a translate further technique is enabled;
    selecting, out of the at least two page sizes for the at least two memory allocations, a smallest page size for which the translate further technique is not enabled.

16. The memory management system of claim 15, wherein the driver is configured to determining that, for at least one page size of the at least two pages sizes for the at least two memory allocations, a translate further technique is enabled by:
    identifying an allocation, out of the at least two memory allocations, for which address translations cover the largest memory address range of the memory address range covered by the first secondary page table; and
    determining that the translate further technique is enabled for page sizes smaller than the allocation for which address translations cover the largest memory address range of the memory address range covered by the first secondary page table.

17. The memory management system of claim 10, wherein:
the memory operation comprises a memory allocation for an amount of memory, the memory allocation performed by an operating system, the operating system finding the amount of memory in a virtual memory address space for the memory allocation.

18. The memory management system of claim 10, wherein:
each secondary page table stores translations for the same amount of virtual memory address space.

19. A non-transitory computer-readable medium storing instructions that, when executed by a processor, cause the processor to:
responsive to a memory operation occurring, determine that a modification is to be performed on a first secondary page table;
determine, based on the memory operation, that the modification is to result in the first secondary page table including page table entries for at least two memory allocations;
determine a page size for the first secondary page table, based on the at least two memory allocations, wherein the page size comprises a virtual page size that is larger than a physical page size of physical pages for which entries of the first secondary page table store translations; and
modify the first secondary page table based on the determined page size,
wherein a primary page table stores a first primary page table entry that references the first secondary page table and a second primary page table entry that references a second secondary page table, and
wherein the second secondary page table stores secondary page table entries that reference pages of the same size as each other and of different sizes than the page size determined for the first secondary page table.

20. The non-transitory computer-readable medium of claim 19, wherein:
each secondary page table stores translations for the same amount of virtual memory address space.

* * * * *